United States Patent Office 2,964,568
Patented Dec. 13, 1960

2,964,568

MANUFACTURE OF LIQUID ALKYLATED PENTABORANES

Herbert Landesman, Covina, Calif., assignor, by mesne assignments, to Olin Mathieson Chemical Corporation, a corporation of Virginia No Drawing. Filed Aug. 6, 1956, Ser. No. 602,457

8 Claims. (Cl. 260—606.5)

This invention relates to the manufacture of liquid alkylated pentaboranes, materials which can be used as fuels as described in Altwicker, Garrett, Weilmuenster and Harris application Serial No. 497,408, filed March 28, 1955.

In accordance with the present invention, it has been discovered that pentaborane and lower alkylsilicates can be reacted in admixture with an alkylation catalyst to form liquid alkylated pentaboranes. The lower alkyl silicates which can be used are those which contain from 1 to 4 carbon atoms in each alkyl radical, among them being methyl orthosilicate, ethyl orthosilicate, lower alkyl polysilicates, and the like. A wide variety of alkylation catalysts can be employed for the purpose of promoting the reaction between the pentaborane and the alkyl silicate, among them being aluminum chloride, aluminum bromide, ferric ch'oride, ferric bromide and so forth. Preferably, the mole ratio of silicate to pentaborane utilized will be within the range from 0.25:1 to 4:1 and the mole ratio of catalyst to silicate will be within the range from 4:1 to 10:1, as the experimental examples given below illustrate. The reaction should be carried out at a temperature between —20° C. and +100° C. At higher temperatures, excessive side reactions to produce ethers, alkanes and alkyl borates are enhanced. The optimum operating temperature range is between 0° C. and +50° C. The alkyl pentaboranes produced by carrying out the reaction can be separated from the reaction mixture by using conventional fractionation, preferably vacuum fractionation.

The following examples illustrate in detail various embodiments which fall within the scope of this invention.

EXAMPLE I

In a 50 cc. glass tube with reagent addition tube and two breakoff devices were put 10.0 g. (0.07 mole) of anhydrous aluminum chloride and 2.0 cc. (1.9 g., 0.009 mole) of ethyl orthosilicate. The tube was immediately stoppered and cooled in a Dry Ice-acetone bath. After the tube was cool, the stopper was removed and the tube attached to the vacuum line, evacuated and sealed off on the addition tube. The reactor was kept in an ice bath overnight since the silicate ester reacts exothermically with aluminum halide. The tube was cooled to —80° C. and sealed to the vacuum line at a breakoff. The breakoff was opened with a magnet and the reactor pumped out for five minutes. Five tenths cc. (0.30 g., 0.0047 mole) of pentaborane was condensed in the tube and it was sealed off from the vacuum line. The reactor stood at 0° for four hours, at room temperature for two days and was heated at 50° for four hours. It was then cooled in liquid nitrogen, sealed to the vacuum line and opened to the vacuum at the remaining breakoff. The volatile materials were transferred with a hot water bath to a graduated tube cooled in the liquid nitrogen and a vo'ume of 1.20 cc. was obtained. The liquid nitrogen bath was replaced with a —80° bath and volatile materials trapped in another tube with a liquid nitrogen bath. Of the 1.20 cc. 0.90 cc. was volatile. This material, as well as the remaining 0.30 cc. were analyzed mass spectrometrically. The material volatile at —80° contained ethane, ether, hydrogen chloride and approximately 1% ethyl pentaborane. The material nonvolatile at —80° was essentially pure ethyl pentaborane. The yield was 0.22 g. ($2.4 \times 10^{-3}$ mole), 51% (based on pentaborane). In this experiment the molar ratio $B_5H_9$ to $AlCl_3$ was 0.067 to 1. The mole ratio $(C_2H_5O)_4Si$ to $AlCl_3$ was 0.13 to 1 and the mole ratio $(C_2H_5O)_4Si$ to $B_5H_9$ was 1.9 to 1.

Table I gives the operating conditions and results obtained in various other experiments falling within the scope of this invention.

Table I

| Example | II | III | IV | V |
|---|---|---|---|---|
| $(C_2H_5O)_4Si$: | | | | |
| (gms.) | 1.9 | 1.9 | | |
| (mols.) | 0.0090 | 0.0090 | | |
| $B_5H_9$: | | | | |
| (gms.) | 0.30 | 0.36 | 0.30 | 0.30. |
| (mols.) | 0.0047 | 0.0056 | 0.0047 | 0.0047. |
| $AlCl_3$: | | | | |
| (gms.) | 1.0 | 8.5 | 1.0 | 10.0. |
| (mols.) | 0.0070 | 0.060 | 0.0070 | 0.070. |
| $(C_2H_5O)_{10}Si_4O_3$: | | | | |
| (gms.) | | | 1.9 | 1.9. |
| (mols.) | | | 0.0030 | 0.0030. |
| Mol. ratio: $B_5H_9/AlCl_3$ | 0.67 | 0.093 | 0.67 | 0.067. |
| Mol. ratio: ester/$B_5H_9$ | 1.9 | 1.6 | 0.64 | 0.64. |
| Mol. ratio: $AlCl_3$/ester | 0.77 | 6.7 | 2.3 | 23.2. |
| Time of reaction | 12 hrs | 12 hrs. at 0°+4 hrs. at 50°. | 36 hrs | 4 hrs. |
| Temperature, ° C | Room Temp | | Room Temp | 100°. |
| Recovered $B_5H_9$ (gms.) | 0.12 | 0 | 0.18 | 0. |
| Gms. $C_2H_5B_5H_8$ | 0.021 | 0.28 | 0.020 | 0.14. |
| Gm. Mol. $C_2H_5B_5H_8$ | $2.3 \times 10^{-4}$ | $3.0 \times 10^{-3}$ | $2.2 \times 10^{-4}$ | $1.5 \times 10^{-3}$. |
| Percent Yield (Based on $B_5H_9$ used) | 8.2 | 53.5 | 11 | 32. |

It is claimed:

1. A method for the preparation of a liquid alkylated pentaborane-9 which comprises reacting from 0.25 to 4 moles of a lower alkyl silicate and 1 mole of pentaborane-9 at a temperature within the range from —0° C. to +100° C. while the reaction mixture contains a catalytic amount of an alkylation catalyst selected from the group consisting of aluminum ch'oride, aluminum bromide, ferric chloride, and ferric bromide.

2. A method for the preparation of a liquid alkylated pentaborane-9 which comprises reacting from 0.25 to 4 moles of a lower alkyl silicate and 1 mole of pentaborane-9 at a temperature within the range from —0° C. to +100° C. while the reaction mixture contains from 4 to 10 moles of an alkylation catalyst selected from the group consisting of aluminum chloride, aluminum bromide, ferric chloride, and ferric bromide per mole of alkyl silicate.

3. The method of claim 2 wherein said lower alkyl silicate is ethyl orthosilicate.

4. The method of claim 2 wherein said lower alkyl silicate is methyl orthosilicate.

5. The method of claim 2 wherein said lower alkyl silicate is $(C_2H_5O)_{10}Si_4O_3$.

6. The method of claim 2 wherein said lower alkyl silicate is ethyl orthosilicate and wherein said catalyst is aluminum chloride.

7. The method of claim 2 wherein said lower alkyl silicate is methyl orthosilicate and wherein said catalyst is aluminum chloride.

8. The method of claim 2 wherein said lower alkyl silicate is $(C_2H_5O)_{10}Si_4O_3$ and wherein said catalyst is aluminum chloride.

No references cited.